United States Patent
Tamari et al.

(10) Patent No.: US 9,813,081 B2
(45) Date of Patent: Nov. 7, 2017

(54) OVER-THE-AIR LOOPBACK FOR ARRAY IDENTIFICATION

(71) Applicant: QUALCOMM Incorporated, San Diego, CA (US)

(72) Inventors: Natan Tamari, Haifa (IL); Amir Shwartz, Yahud (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/422,272

(22) Filed: Feb. 1, 2017

(65) Prior Publication Data

US 2017/0222668 A1 Aug. 3, 2017

Related U.S. Application Data

(60) Provisional application No. 62/290,797, filed on Feb. 3, 2016.

(51) Int. Cl.
*H04B 1/40* (2015.01)
*H04B 1/00* (2006.01)
*H04B 1/3827* (2015.01)
*H04B 17/14* (2015.01)

(52) U.S. Cl.
CPC ......... *H04B 1/0064* (2013.01); *H04B 1/3827* (2013.01); *H04B 17/14* (2015.01)

(58) Field of Classification Search
USPC ..................................... 455/84, 522, 69–70
See application file for complete search history.

(56) References Cited

U.S. PATENT DOCUMENTS

| | | |
|---|---|---|
| 8,718,584 B2 | 5/2014 | Seendripu et al. |
| 9,220,106 B2 | 12/2015 | Kahrizi et al. |
| 2008/0159435 A1* | 7/2008 | Cohen ................... H03F 1/3247 375/297 |
| 2008/0242240 A1* | 10/2008 | Rofougaran ........... H04B 1/406 455/86 |

(Continued)

OTHER PUBLICATIONS

International Search Report and Written Opinion—PCT/US2017/016206—ISA/EPO—dated Apr. 3, 2017.

(Continued)

*Primary Examiner* — Fayyaz Alam
(74) *Attorney, Agent, or Firm* — Patterson & Sheridan, LLP (57) ABSTRACT

Certain aspects relate to methods and apparatus for identifying which antenna module is attached to a baseband module port at runtime. For example, an apparatus includes a first radio frequency (RF) module that generates first RF signals based on first intermediate frequency (IF) signals corresponding to a known sequence, and outputs the first RF signals for transmission via a first antenna element, a second RF module that obtains the first RF signals via a second antenna element and processes the first RF signals to generate second IF signals, and a baseband module having first and second ports and generates the first IF signals, to determine which port of the first or second RF modules is coupled to, based on at least one of the first or second IF signals, and to configure at least one of the first or second RF module, according to known configurations, based on the determination.

13 Claims, 8 Drawing Sheets

(56) References Cited

U.S. PATENT DOCUMENTS

| | | | | |
|---|---|---|---|---|
| 2010/0112962 | A1* | 5/2010 | van Zeijl | H04B 1/0475 |
| | | | | 455/77 |
| 2012/0295561 | A1 | 11/2012 | Shen et al. | |
| 2012/0309325 | A1 | 12/2012 | Carbone et al. | |
| 2012/0309331 | A1 | 12/2012 | Yehezkely et al. | |
| 2013/0089130 | A1 | 4/2013 | Shen et al. | |
| 2014/0065968 | A1* | 3/2014 | Rettig | H01Q 1/22 |
| | | | | 455/41.2 |
| 2014/0256376 | A1* | 9/2014 | Weissman | H04B 17/19 |
| | | | | 455/550.1 |
| 2017/0078979 | A1* | 3/2017 | Osterling | H04W 24/06 |

OTHER PUBLICATIONS

Shirke P., et al., "Analysis of RFID Based Positioning Technique Using Received Signal Strength and Directional Antenna", Positioning, May 2016, vol. 7, No. 2, pp. 80-89, http://dx.doi.org/10.4236/pos.2016.72008.

* cited by examiner

OVER-THE-AIR LOOPBACK FOR ARRAY IDENTIFICATION

CLAIM OF PRIORITY UNDER 35 U.S.C. §119

The present application for patent claims benefit of U.S. Provisional Patent Application Ser. No. 62/290,797, filed Feb. 3, 2016, assigned to the assignee hereof and hereby expressly incorporated by reference herein.

FIELD

The present disclosure relates generally to wireless communication, and more particularly, to methods and apparatus for identifying which antenna module is attached to a baseband module port at runtime.

BACKGROUND

The 60 GHz band is an unlicensed band which features a large amount of bandwidth and a large worldwide overlap. The large bandwidth means that a very high volume of information can be transmitted wirelessly. As a result, multiple applications, that may include transmission of a large amount of data, can be developed to allow wireless communication around the 60 GHz band. Examples for such applications include, but are not limited to, wireless high definition TV (HDTV), wireless docking stations, wireless Gigabit Ethernet, and many others.

In order to facilitate such applications integrated circuits (ICs), such as amplifiers, mixers, radio frequency (RF) analog circuits, and active antennas that operate in the 60 GHz frequency range may be developed. An RF system typically includes active and passive modules. The active modules (e.g., a phase-array antenna) may require control and power signals for their operation, which may not be required by passive modules (e.g., filters). The various modules are fabricated and packaged as radio frequency integrated circuits (RFICs) that can be assembled on a printed circuit board (PCB). The size of the RFIC package may range from several to a few hundred square millimeters.

In the market of consumer electronics, the design of electronic devices, and thus RF modules integrated therein, should meet the constraints of minimum cost, size, and weight. The design of the RF modules should also take into consideration the current assembly of electronic devices, and particularly handheld devices, such as laptop and tablet computers in order to enable efficient transmission and reception of millimeter wave signals.

SUMMARY

Certain aspects of the present disclosure provide an apparatus for wireless communications. The apparatus generally includes a first radio frequency (RF) module configured to generate first RF signals based on first intermediate frequency (IF) signals corresponding to a known sequence, and to output the first RF signals for transmission via at least a first antenna element, at least a second RF module configured to obtain the first RF signals via at least a second antenna element and to process the first RF signals to generate at least second intermediate frequency (IF) signals, and a baseband module having at least first and second ports and configured to generate the first IF signals, determine which port at least one of the first or second RF module is coupled to, based on at least one of the first or second IF signals, and configure at least one of the first or second RF module, according to one or more known configurations, based on the determination.

Certain aspects of the present disclosure provide an apparatus for wireless communications. The apparatus generally includes a first interface configured to provide first intermediate signals corresponding to a first known sequence to a first radio frequency (RF) module for generating first RF signals to be output for transmission via at least a first antenna element, a second interface configured to obtain second intermediate signals generated by a second RF module based on the first RF signals as received via at least a second antenna element. and a processing system configured to determine which port, of at least first and second ports of the apparatus, at least one of the first RF module or the second RF module is coupled to, based on the first and second intermediate signals, and configure at least one of the first RF module or the second RF module based on the determination.

Aspects also provide various apparatus, systems, computer program products, and processing systems for performing the operations described above.

DETAILED DESCRIPTION

Certain aspects of the present disclosure enable connectivity of one more RF modules to a baseband module using a flexible PCB. In some cases, transmission lines for direct current (DC) power and/or sensors may be included in the flexible PCB. In some cases, antennas may be incorporated in the flexible PCB.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of radio frequency (RF) communication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Figure 1:
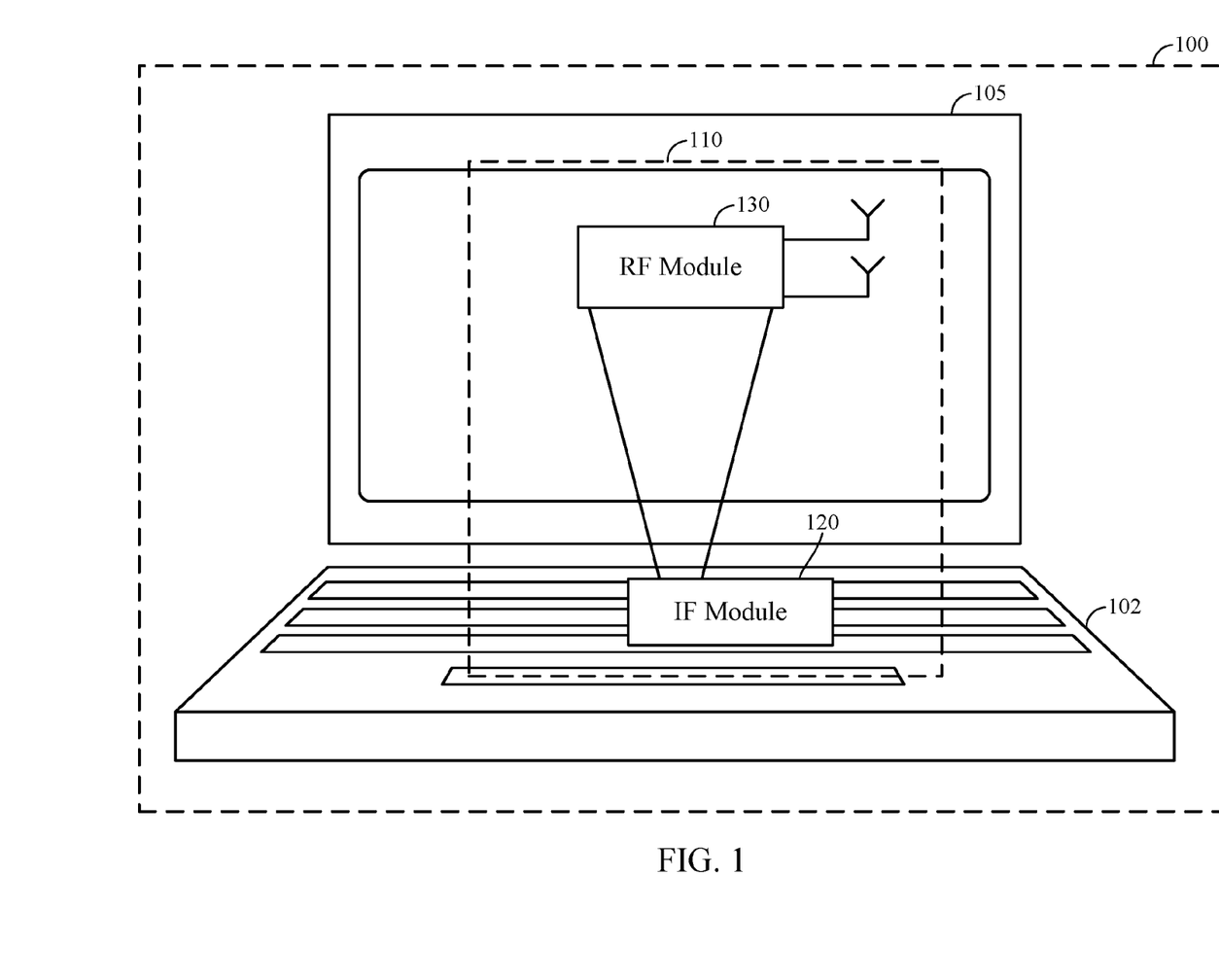
FIG. 1 illustrates an example laptop computer having radio transmission capabilities.

FIG. 1 illustrates an example laptop computer 100 that includes a radio frequency (RF) system 110 for transmission and reception of signals. The form factor of the RF system 110 is spread between the base plane 102 and lid planes 105 of the laptop computer 100.

The RF system 110 includes two parts: a baseband module 120 and RF module 130 respectively connected to the base plane 102 and lid plane 105. The RF module 130 includes active transmit (TX) and receive (RX) antennas. When transmitting signals, the baseband module 120 may provide the RF module 130 with control, local oscillator (LO), intermediate frequency (IF), and direct current (DC) power signals. The control signal may be utilized for functions, such as gain control, RX/TX switching, power level control, sensors, and detectors readouts. Specifically, beamforming based RF systems may require high frequency beam steering operations which are performed under the control of the baseband module 120. The control typically originates at the baseband module 120 of the system, and transfers between the baseband module 120 and RF module 130.

The RF module 130 typically performs up-conversion, using a mixer (not shown) on the IF signal(s) to RF signals and then transmits the RF signals through the TX antenna according to the control of the control signals. The power signals are direct current (DC) voltage signals that power the various components of the RF module 130. While the IF signals may be lower frequency relative to the RF signals, more generally, any type of interface signals may be used between baseband and RF modules. As such signals are used to communicate between a baseband module and an RF module may be generally referred to herein as intermediate signals (regardless of their frequency).

In the receive direction, the RF module 130 receives RF signals at the frequency band of 60 GHz, through the active RX antenna and performs down-conversion, using a mixer, to IF signals using the LO signals, and sends the IF signals to baseband module 120. The operation of the RF module 130 is controlled by the control signal, but certain control information (e.g., feedback signal) is sent back to the baseband module 120.

Current solutions may include at least two cables (transmission lines) to transfer the IF, LO, power, and control signals between the baseband modules 120 and RF module 130.

This drawback is critical in millimeter-wave RF systems, e.g., systems that operate in the 60 GHz frequency bands, as the RF module 130 must be located close to the active antennas to perform the functions described above in order to minimize the power loss of the received and transmit signals. Thus, the baseband module 120 is located apart from the RF module 130. Further, because transferring high frequency signals over the cables significantly attenuates the signals, cables that provide low attenuation characteristics are utilized. However, such cables are relativity expensive, thus increasing the bill of material (BoM) of consumer electronics devices.

It would be therefore advantageous to provide a solution for connecting, using a single transmission line, radio frequency modules in an electronic device for use in at least the 60 GHz frequency band.

Figure 2:
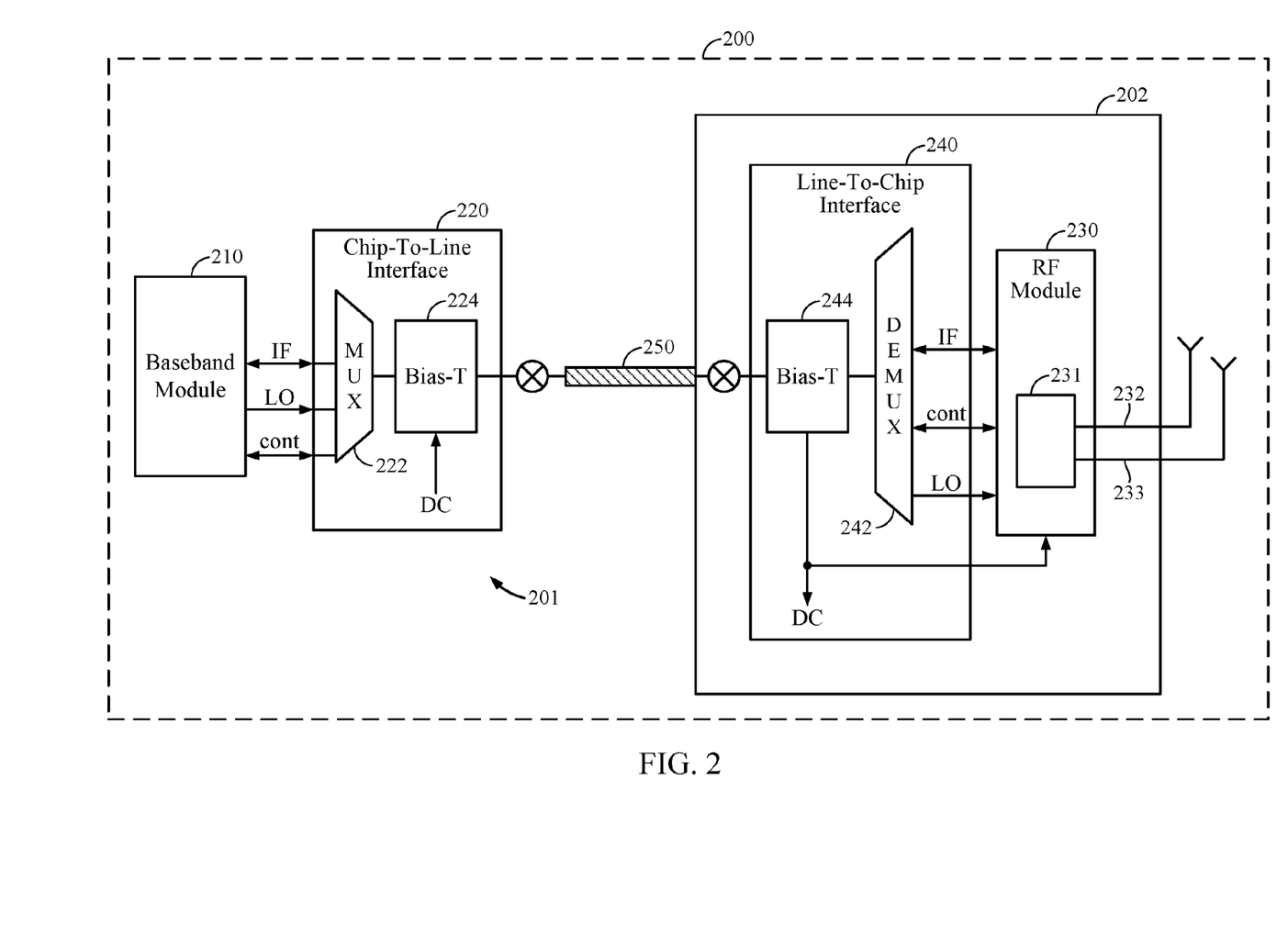
FIG. 2 illustrates an example RF system, in accordance with certain aspects of the present disclosure.

FIG. 2 illustrated an example RF system 200 utilized to describe various aspects of the present disclosure. The RF system 200 includes a baseband module 210 coupled to a chip-to-line interface module 220. In addition, the RF system 200 includes an RF module 230 coupled to a line-to-chip interface module 240. The RF module 230 includes a RF circuitry 231 to perform up and down conversions of radio signals and to control the TX and RX active antennas 232 and 233. In an embodiment of the present disclosure, each of the antennas 232 and 233 is a phase array antenna. The RF system 200 enables the efficient transmission and reception of signals in at least the 60 GHz band.

The baseband module 210 and RF module 230 are apart from each other and are connected using a single transmission line 250 through the chip-to-line interface 220 and line-to-chip interface 240. In one embodiment, the baseband module 210 and RF module 230 are respectively located at the base plane and lid plane of a laptop computer. One of ordinary skill should appreciate that a connection between the base and lid planes is using, for example, a cable. Placing the baseband module 210 and RF module 230 apart from each may be done in order to locate the active antennas 232 and 233 at such a location where optional reception/transmission of signals may be achieved. Such a location is typically not in proximity to the baseband module which is usually placed by the device's fan/ventilation. As another example, at a tablet computer, the baseband module 210 and RF module 230 are located at opposite ends of the tablet.

At least four different signals are simultaneously transferred over the transmission line 250 including, but not limited to, power, control, intermediate frequency (IF), and local oscillator source (LO). It should be noted that the IF and control signals are transferred over the transmission line 250 in both directions. The control signal controls, at least, the switching of the TX and RX active antennas 232 and 233, the direction of the antenna (beam forming), and gain control. The LO signals may be included to synchronize the two modules and to perform up and down conversions of high frequency signals.

Each signal transferred over the transmission line 250 has a different frequency band. In an embodiment of the present disclosure, a frequency plan is disclosed that enables the efficient transfer of the five signals over the transmission line 250. In accordance with an embodiment of the present disclosure, the transmission line 250 is a standard micro coaxial cable. In this embodiment, the connection between the PCS and the micro coaxial cable is using a micro connector. According to another embodiment, the transmission line 250 can be formed by fabricating a metal line on a multilayer sub structure.

During the simultaneous transfer of the LO, IF, control and power signals over the transmission line 250, the chip-to-line interface 220 and line-to-chip interface 240 are utilized. The chip-to-line interface 220 and line-to-chip 240 multiplex the various signals and impedance matches between the transmission line 250 and the PCBs to which the baseband module 210 and RF module 230 are connected to.

As shown in FIG. 2, the chip-to-line interface 220 includes a multiplexer 222 and a Bias-T unit 224 and the line-to-chip interface 240 includes a demultiplexer 242 and a Bias-T unit 244. The multiplexer 222 multiplexes the IF signal, LO signal, and control signal to be output on a single output provided to the input of the Bias-T unit 224. The Bias-T unit 224 adds a DC voltage signal from a power source and outputs the signal to the transmission line 250. The multiplexer 222 also performs a demultiplexing operation to produce the IF signal(s) and control signal transferred from the RF module 230.

The demultiplexer 242 de-multiplexes the input received on the transmission line 250, to generate the control signal, IF signal, and LO signal. Prior to that, the Bias-T unit 244 extracts the DC voltage signal to power the RF module 230. It should be noted that the DC voltage signal is always provided to the RF module 230 to enable proper operation. The demultiplexer 242 also performs a multiplexing operation on the IF signal (results of a down conversion of the received RF signals) and control signal to be transferred to the baseband module 210.

In the embodiment illustrated in FIG. 2, the multiplexer 222 and Bias-T unit 224 are integrated in the baseband module 210 which are embedded in an RFIC. In the same fashion, the demultiplexer 242 and Bias-T unit 244 are integrated in the RF module 230, which is fabricated as an RFIC. In another embodiment, the multiplexer 222 and demultiplexer 242 are part of the baseband and RF modules respectively, thus are part of RFICs. The Bias-T units 224 and 244, on the other hand, are part of PCBs 201 and 202, thus the DC signal multiplexing/demultiplexing is performed over the PCBs 201 and 202.

In an embodiment of the present disclosure the source of the LO signal is at the RF module 230. Accordingly, the LO signal is multiplexed with the received IF signal (after down conversion) and transferred to the baseband module 210 over the transmission line 250.

In the embodiment shown in FIG. 2, the baseband module 210 and RF module 230 are fabricated on different substrates and connected using a transmission line (e.g., a cable). According to another embodiment of the present disclosure, the RF and baseband modules are fabricated on the same substrate and are connected using a coaxial cable. In this embodiment, the techniques disclosed herein for multiplexing the signals are also applied.

Figure 3:
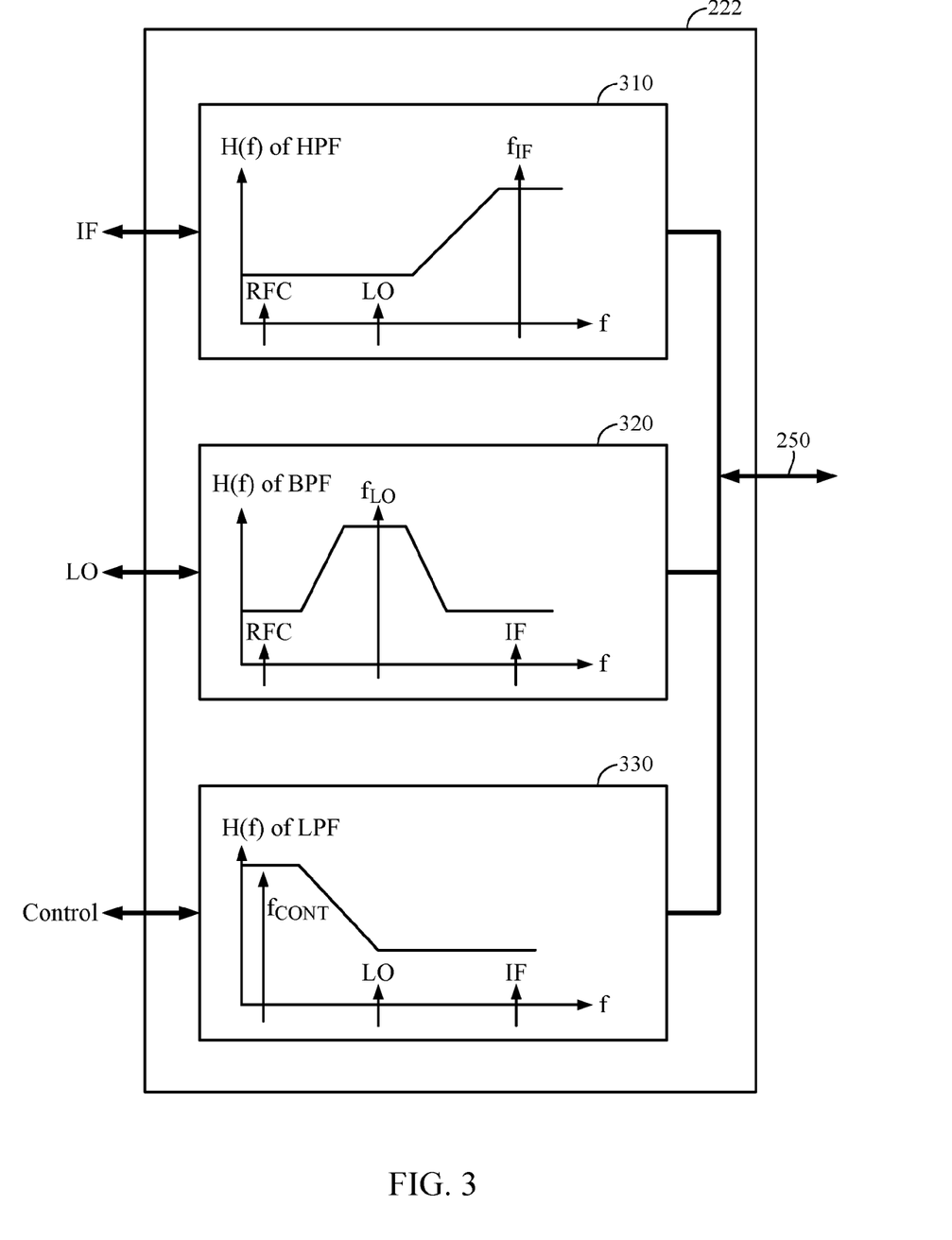
FIG. 3 illustrates an example multiplexer, in accordance with certain aspects of the present disclosure.

FIG. 3 shows a non-limiting block diagram of the multiplexer 222 constructed in accordance with an embodiment of the present disclosure. The multiplexer 222 separates the frequency spectrum to three different frequency bands: $f_{IF}$, $f_{LO}$, and $f_{CTRL}$ to multiplex the LO signal, IF signal, and control signal in these bands respectively. Specifically, the multiplexer 222 includes a high-pass filter (HPF) 310, a base-pass filter (BPF) 320, and a low-pass filter (LPF) 330; each passes signals in the $f_{IF}$, $f_{LO}$, and $f_{CTRL}$ respectively.

Example Over-the-Air Loopback for Array Identification

As described above, with reference to FIG. 2, in some implementations, a wireless device may utilize separate RF modules (e.g., antenna modules) and a baseband module connected via one or more transmission lines 250. For example, a 60 GHz WiFi solution can consist of two separate chips and Single in-line packages (SiPs) for antenna arrays. The RF modules may be located near/with antennas (or antenna arrays), for example, at an optimal radiation point, while the baseband module may be located near an application processor.

Each antenna module may be configured with a unique, predetermined configuration, which is loaded from the baseband module. One technique for loading each antenna module's predetermined configuration is to apply a software (SW) enumeration to each antenna module and, when a device is being assembled, carefully connect each antenna module to the corresponding port of the baseband module.

According to aspects of the present disclosure, this cumbersome production technique may be eliminated by using an over-the-air (OTA) loopback technique to load the correct configuration to each antenna module at run-time.

As used herein, the term port generally refers to an interface of one module to obtain signals from and/or provide signals to another module. In the context of the present disclosure, a baseband module may have different ports to obtain signals from and/or provide signals to different RF (antenna) modules. Ports may be separate physical interfaces or virtual/logical ports that share physical interfaces but use multiplexing to distinguish signals to/from different RF modules.

For receive processing, one or more of the RF modules may process RF signals received via one or more antenna arrays and provide intermediate frequency (IF) signals to the baseband module via respective ports. For transmit processing, the baseband module may provide IF signals to one or more of the RF modules to process and generate RF signals to be transmitted via one or more antenna arrays.

According to aspects of the present disclosure, a baseband module may determine, in run-time, an enumeration of antenna modules (e.g., a correspondence between ports of the baseband module and antenna modules). Techniques for run-time enumeration of antenna modules by a baseband module are described in more detail below.

Figure 4:
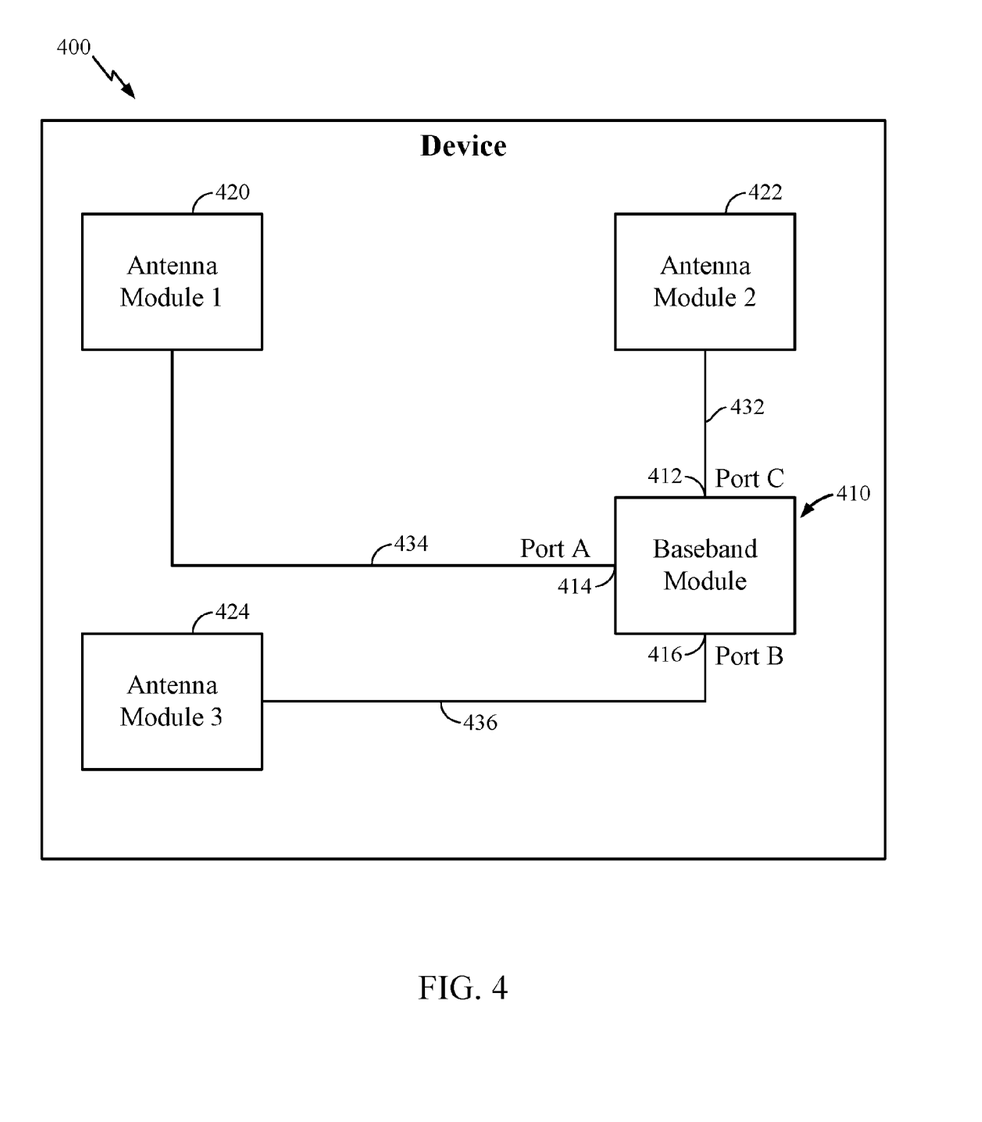
FIG. 4 illustrates an example RF system, in accordance with certain aspects of the present disclosure.

FIG. 4 illustrates an RF system 400 including a baseband module 410 and three antenna modules 420, 422, and 424, in accordance with certain aspects of the present disclosure. Each antenna module may correspond, for example, to a RF module 230 shown in FIG. 2 and/or an RF module 230 and corresponding line-to-chip interface 240. Each antenna module 420, 422, and 424 may have a corresponding port 412, 414, and 416 that serves as an interface with baseband module 410. Each port may, for example, accommodate signals (such as IF, LO, and control signals) and may include circuitry, such as that shown in chip to line interface 220 shown in FIG. 2.

While the RF system 400 is illustrated with three antenna modules 420, 422, and 424, the disclosure is not so limited and may be used with RF systems having two or more antenna modules. The baseband module 410 has a plurality of ports 412, 414, 416, through which the baseband module 410 sends signals to the antenna modules 420, 422, and 424. The RF system 400 further includes three signal lines (e.g., wires, cables) 432, 434, and 436, with each signal line connecting one port 412, 414, 416 of the baseband module 410 to an antenna module 422, 420, and 424, respectively.

Figure 5:
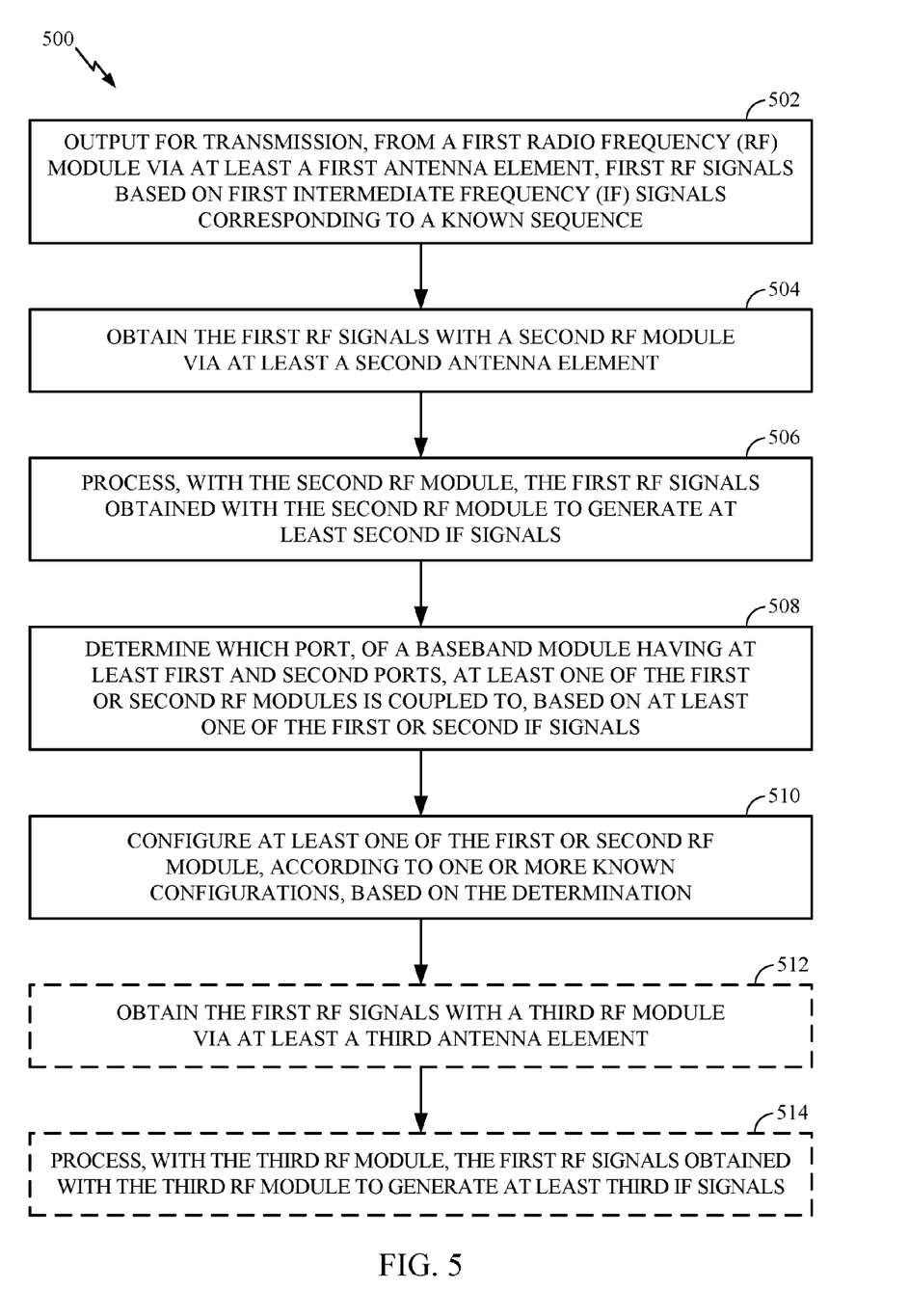
FIG. 5 illustrates an example operation, in accordance with certain aspects of the present disclosure.

FIG. 5 illustrates an example operation 500 for identifying antenna arrays using over-the-air loopback techniques, in accordance with certain aspects of the present disclosure. Operation 500 may be performed by a wireless communications device (e.g., laptop computer 100 shown in FIG. 1, RF system 200 shown in FIG. 2, RF system 400 shown in FIG. 4) as part of an initiation procedure (e.g., power-up, boot-up) of the device.

Operation 500 begins at block 502 by outputting for transmission, from a first radio frequency (RF) module (e.g., antenna module 420 shown in FIG. 4) via at least a first antenna element, first RF signals based on first intermediate frequency (IF) signals corresponding to a known sequence. Antenna element may refer to an antenna in a module having only one antenna or an antenna that is part of an antenna array. The first IF signals may be generated by a baseband module (e.g., baseband module 410 in FIG. 4) and sent to the first RF module from a first port (e.g., port 414 shown in FIG. 4). The first IF signals may be conveyed by a signal line (e.g., signal line 434 shown in FIG. 4) from the baseband module to the first RF module. Basing the first RF signals on IF signals corresponding to a known sequence may cause the first RF signals to be a predictable or known signal.

Operation 500 continues at block 504 by obtaining the first RF signals with a second RF module (e.g., antenna module 422 shown in FIG. 4) via at least a second antenna element. The second RF module receives the first RF signals that were transmitted from the first RF module over-the-air, i.e., as propagated through the air from the first antenna element to the second antenna element.

Operation 500 continues at block 506 by processing, with the second RF module, the first RF signals obtained with the second RF module to generate at least second IF signals. The second IF signals may be conveyed by a signal line (e.g., signal line 432 shown in FIG. 4) from the second RF module to a port (e.g., port 412) of the baseband module.

At block 508, operation 500 continues by determining which port, of a baseband module having at least first and second ports, at least one of the first or second RF module is coupled to, based on at least one of the first or second IF signals. That is, a baseband module determines which port of the baseband module is connected with at least one of the RF modules based on at least one of the first or second IF signals.

At block 510, operation 510 continues by configuring at least one of the first or second RF module, according to one or more known configurations, based on the determination. For example and with reference to FIG. 4, a baseband module 410 may determine that antenna module 422 is connected to port 412 of the baseband module, based on IF signals (e.g., second IF signals) supplied to the baseband module via port 412. Continuing the example, the baseband module may have known configurations for RF module 420 and RF module 422 and may configure the antenna module connected with port 412 with the known configuration for RF module 422.

According to aspects of the present disclosure, operation 500 may include additional blocks if the device includes additional RF modules. For example, if the device has a third RF module (e.g., antenna module 424 shown in FIG. 4) and the baseband module has a third port (e.g., antenna port 416 shown in FIG. 4), the operation 500 may include optional blocks 512 and 514. At block 512, operation 500 continues by obtaining the first RF signals with a third RF module via at least a third antenna element. The third RF module also receives the first RF signals that were transmitted from the first RF module over-the-air. Operation 500 continues at block 514 by processing, with the third RF module, the first RF signals obtained with the third RF module to generate at least third IF signals. The third IF signals may be conveyed by a signal line (e.g., signal line 436 shown in FIG. 4) from the third RF module to a port of the baseband module. The determining step described in block 508 may include determining which port at least one of the first, second, or third RF modules is coupled to, based on the first, second, and third IF signals.

Figure 6:
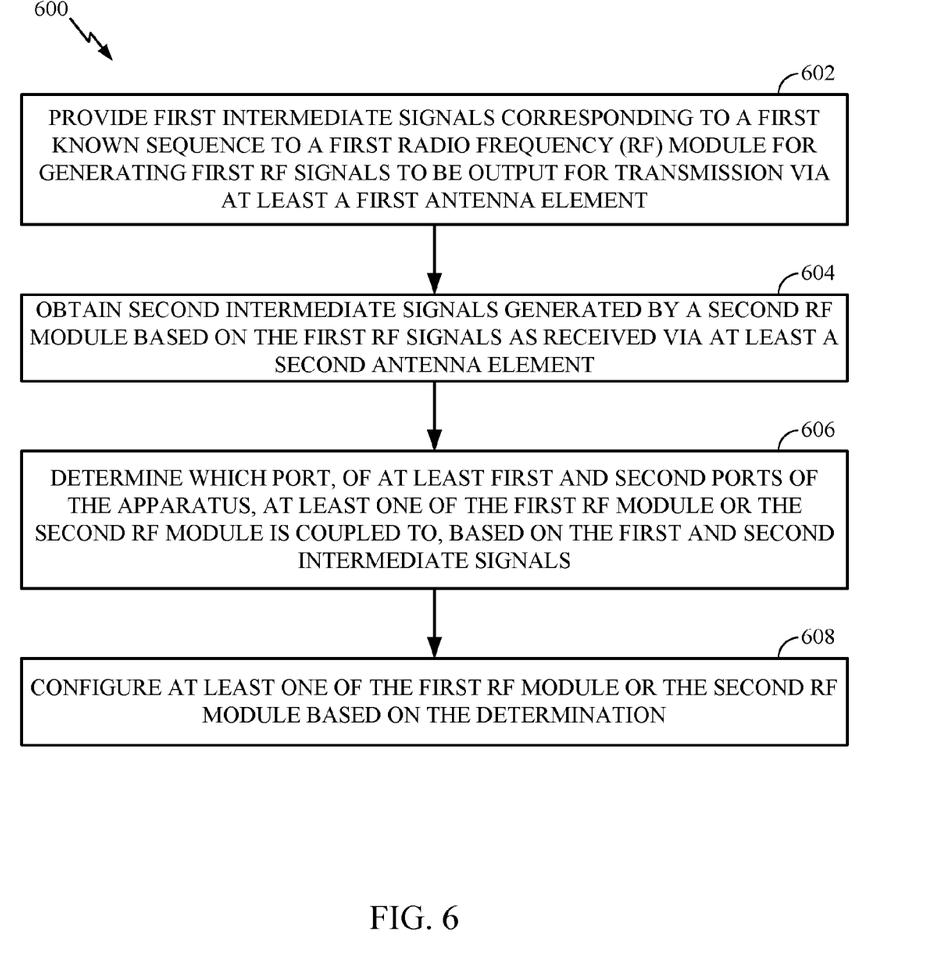
FIG. 6 illustrates example operations that may be performed by a baseband module, in accordance with certain aspects of the present disclosure.

FIG. 6 illustrates example operations 600 that may be considered operations performed, for example, from the baseband module perspective, to configure antenna/RF modules according to aspects of the present disclosure.

Operations 600 begin, at 602, by providing first intermediate signals corresponding to a first known sequence to a first radio frequency (RF) module for generating first RF signals to be output for transmission via a first antenna element. At 604, the baseband module obtains second intermediate signals, wherein the second intermediate signals were generated by a second RF module based on the first RF signals as received via a second antenna element (e.g., the over the air signal generated by RF module 1 as received at RF module 2). At 606, the baseband module determines which of the first and second ports is coupled to at least one of the first RF module or the second RF module, wherein the determination is based on the first and second intermediate signals. At 608, the baseband module configuring at least one of: the first RF module if it is determined the first or second port is coupled to the first RF module; or the second RF module if it is determined the first or second port is coupled to the second RF module.

According to aspects of the present disclosure, the second IF signals and the third IF signals may be used by the baseband module to calculate distances between at least two of the first, second, and third RF modules, as well as a direction of arrival (DOA) for at least one of the first RF signal at the second RF module. The distance and direction of arrival can then be compared with a database of values obtained by testing of known antenna configurations. The correct correspondence of ports and RF modules, e.g., "antenna 1 is connected to port A, antenna 2 is connected to port C," may then be determined from the comparisons.

According to aspects of the present disclosure, a baseband module may perform operation 500 multiple times while causing each RF module (e.g., antenna module) of the RF device to act as the first RF module at least once. Having each RF module act as the first RF module in operation 500 may resolve ambiguities in determining the positions of the antenna modules.

According to aspects of the present disclosure, a baseband module may configure at least one of the first and second RF modules according to a first known (e.g., default) configuration upon power-up (e.g., boot-up) of the RF modules. The baseband module may supply a second known (e.g., specific to an RF module at a particular location in the device) configuration to the first RF module after determining which port the first RF module is coupled to.

It is understood that the specific order or hierarchy of steps in the processes disclosed above is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

Figure 5A:
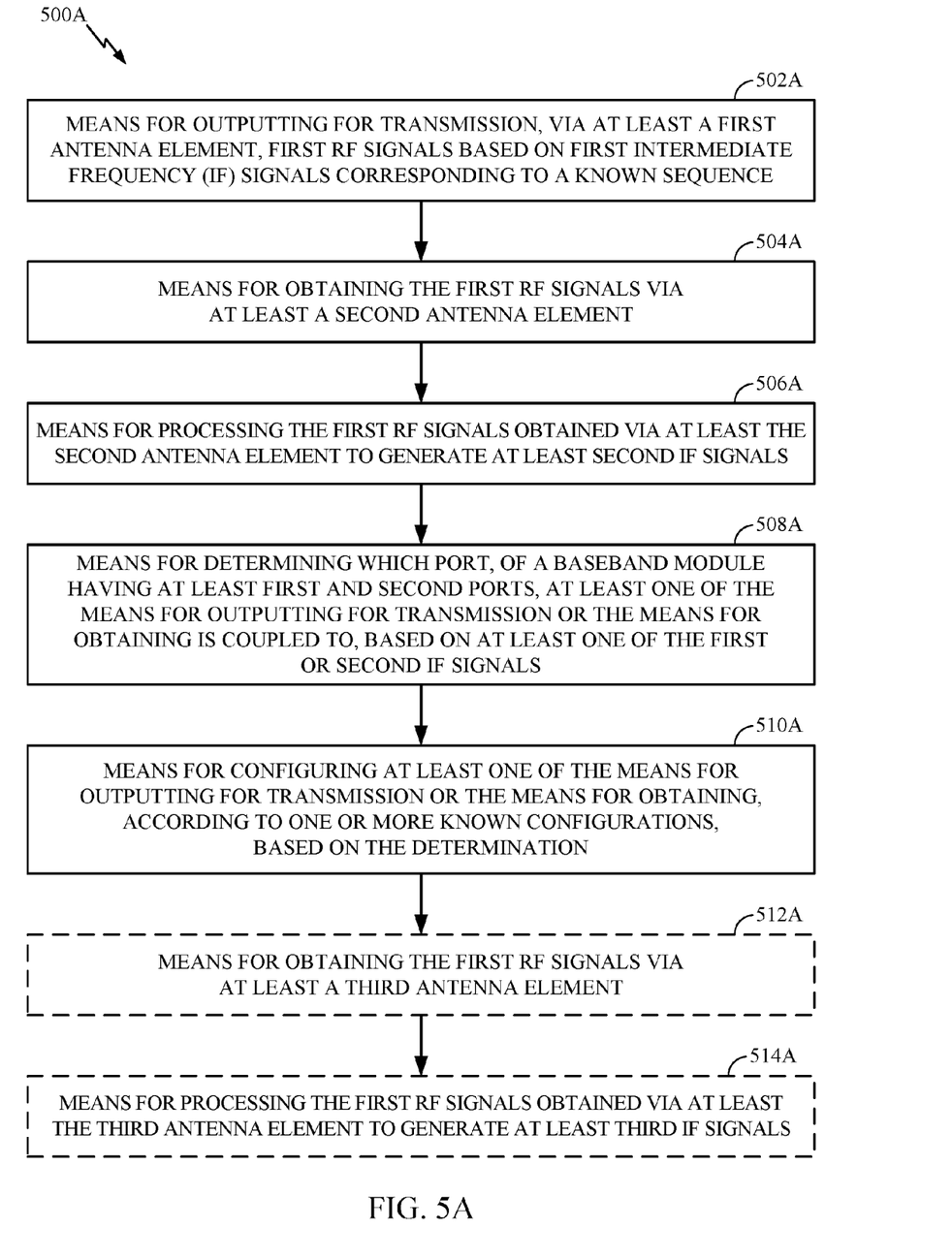
FIG. 5A illustrates example means capable of performing the operations of FIG. 5.
Figure 6A:
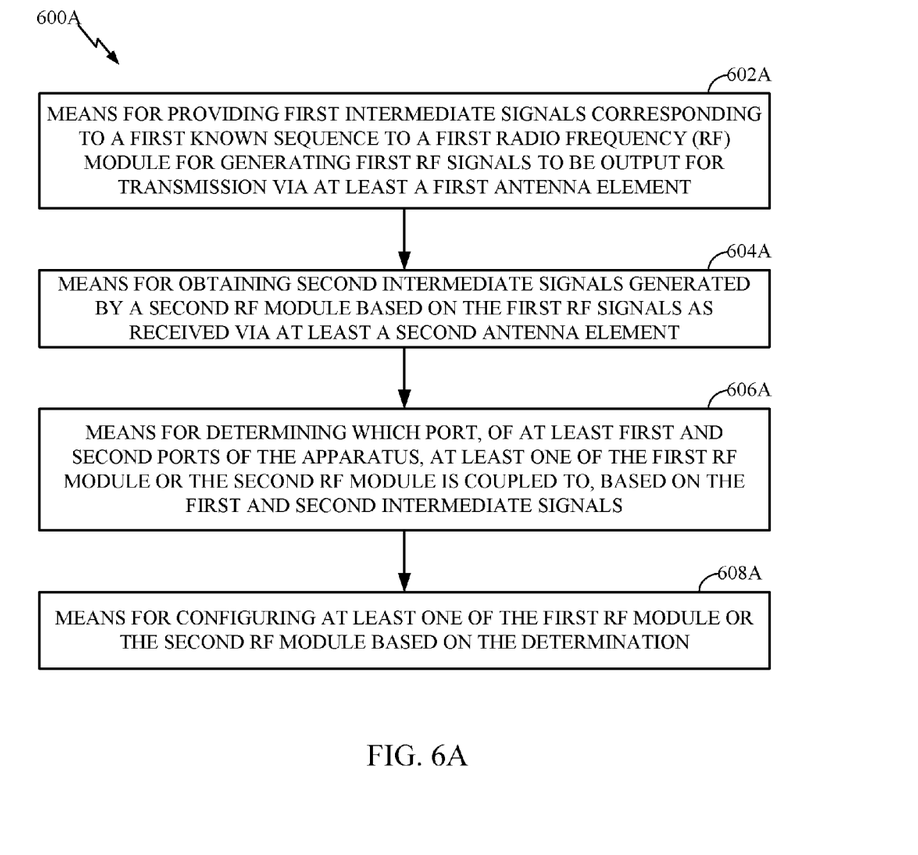
FIG. 6A illustrates example means capable of performing the operations of FIG. 6.

Generally, where there are operations illustrated in figures, those operations may have corresponding counterpart means-plus-function components with similar numbering. For example, operations 500 and 600 illustrated in FIGS. 5 and 6 correspond to means 500A and 600A illustrated in FIGS. 5A and 6A, respectively.

For example, means for receiving and means for obtaining may be a receive portion of an RF chip and/or an antenna(s) 420, 422, and/or 424 of the RF system 400 illustrated in FIG. 4. Means for transmitting and means for outputting or means for providing may be a transmit portion of an RF chip and/or an antenna(s) 420, 422, and/or 424 of the RF system 400 illustrated in FIG. 4.

Means for estimating, means for selecting, means for performing, means for generating, means for including, means for normalizing, means for adjusting, means for determining, and means for providing may comprise a processing system, which may include one or more processors, such as a RX data processor, a TX data processor, and/or a controller of a station (STA) or a TX data processor, a RX data processor, and/or a controller of the access point.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a station (STA) 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media. Thus, certain aspects may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a STA and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a STA and/or base station can obtain the various methods upon coupling or providing the storage means to the device. Moreover, any other suitable technique for providing the methods and techniques described herein to a device can be utilized.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus for wireless communications, comprising:
   first and second ports;
   a first interface configured to provide first intermediate signals corresponding to a first known sequence to a first radio frequency (RF) module for generating first RF signals to be output for transmission via a first antenna element;
   a second interface configured to obtain second intermediate signals, wherein the second intermediate signals were generated by a second RF module based on the first RF signals as received via a second antenna element; and
   a processing system configured to,
      determine which of the first and second ports is coupled to at least one of the first RF module or the second RF module, wherein the determination is based on the first and second intermediate signals, and
      configure at least one of:
         the first RF module if it is determined the first or second port is coupled to the first RF module; or
         the second RF module if it is determined the first or second port is coupled to the second RF module.

2. The apparatus of claim 1, further comprising a third port, wherein:
   the second interface is further configured to obtain third intermediate signals, wherein the third intermediate signals were generated by a third RF module based on the first RF signals received via a third antenna element; and
   the processing system is further configured to,
      determine which of the first port, the second port and the third port, is coupled to the third RF module, wherein the determination of which port is coupled to the third RF module is based on the first and third intermediate signals, and configure the third RF module if it is determined the first port, the second port, or the third port is coupled to the third RF module.

3. The apparatus of claim 2, wherein the processing system is further configured to:

calculate a distance between two of the first RF module, the second RF module, and the third RF module, wherein the calculation is based on at least one of the second intermediate signals or the third intermediate signals; and estimate a direction of arrival (DOA) of the first RF signals at at least one of the second RF module or the third RF module, wherein the estimation is based on at least one of the second intermediate signals or the third intermediate signals, and wherein the determination of which port is coupled to at least one of the first RF module the second RF module, or the third RF module is based on the calculated distance and estimated DOA.

4. The apparatus of claim 1, wherein:

the processing system is configured to configure at least one of the first RF module or the second RF module, according to a first known configuration, prior to providing the first intermediate signals.

5. The apparatus of claim 1, wherein the configuration is based on one or more known configurations.

6. The apparatus of claim 1, wherein:

the first interface is further configured to provide third intermediate signals corresponding to the first known sequence or a second known sequence to the second RF module for generating second RF signals to be output for transmission via the second antenna element;

the second interface is further configured to obtain fourth intermediate signals, wherein the fourth intermediate signals were generated by the first RF module based on the second RF signals as received via the first antenna element; and the determination is also based on the third intermediate signals and the fourth intermediate signals.

7. A method for wireless communications, comprising:

providing first and second ports;

providing first intermediate signals corresponding to a first known sequence to a first radio frequency (RF) module for generating first RF signals to be output for transmission via a first antenna element;

obtaining second intermediate signals, wherein the second intermediate signals were generated by a second RF module based on the first RF signals as received via a second antenna element;

determining which of the first and second ports is coupled to at least one of the first RF module or the second RF module, wherein the determination is based on the first and second intermediate signals, and configuring at least one of:

the first RF module if it is determined the first or second port is coupled to the first RF module; or the second RF module if it is determined the first or second port is coupled to the second RF module.

8. The method of claim 7, further comprising:

obtaining third intermediate signals, wherein the third intermediate signals were generated by a third RF module based on the first RF signals as received via a third antenna element;

determining which of the first port, the second port and a third port is coupled to the third RF module, wherein the determination of which port is coupled to the third RF module is based on the first and third intermediate signals, and configuring the third RF module if it is determined the first port, the second port, or the third port is coupled to the third RF module.

9. The method of claim 8, further comprising:

calculating a distance between two of the first RF module, the second RF module, and the third RF module, wherein the calculation is based on at least one of the second intermediate signals or the third intermediate signals; and estimating a direction of arrival (DOA) of the first RF signals at least one of the second RF module or the third RF module, wherein the estimation is based on at least one of the second intermediate signals or the third intermediate signals, and wherein the determination of which port is coupled to at least one of the first RF module, the second RF module, or the third RF module is based on the calculated distance and estimated DOA.

10. The method of claim 7, wherein the configuring comprises:

configuring at least one of the first RF module or the second RF module, according to a first known configuration, prior to providing the first intermediate signals.

11. The method of claim 7, wherein the configuration is based on one or more known configurations.

12. The method of claim 7, further comprising:

providing third intermediate signals corresponding to the first known sequence or a second known sequence to the second RF module for generating second RF signals to be output for transmission via the second antenna element; and obtaining fourth intermediate signals, wherein the fourth intermediate signals were generated by the first RF module based on the second RF signals as received via the first antenna element; and wherein the determination is also based on the third intermediate signals and the fourth intermediate signals.

13. A wireless station, comprising:

first and second antenna elements;

first and second ports;

first and second radio frequency (RF) modules;

a first interface configured to provide first intermediate signals corresponding to a first known sequence to the first RF module for generating first RF signals to be transmitted via the first antenna element;

a second interface configured to obtain second intermediate signals, wherein the second intermediate signals were generated by the second RF module based on the first RF signals as received via the second antenna element; and a processing system configured to, determine which of the first and second ports is coupled to at least one of the first RF module or the second RF module, wherein the determination is based on the first and second intermediate signals, and configure at least one of:

the first RF module if it is determined the first or second port is coupled to the first RF module; or the second RF module if it is determined the first or second port is coupled to the second RF module.

* * * * *